United States Patent

Fortinsky

[19]

[11] Patent Number: 5,815,574
[45] Date of Patent: Sep. 29, 1998

[54] PROVISION OF SECURE ACCESS TO EXTERNAL RESOURCES FROM A DISTRIBUTED COMPUTING ENVIRONMENT

[75] Inventor: Michael S. Fortinsky, Netanya, Israel

[73] Assignee: International Business Machines Corporation, Armonk, N.Y.

[21] Appl. No.: 563,692

[22] Filed: Nov. 28, 1995

[30] Foreign Application Priority Data

Dec. 15, 1994 [CA] Canada .................................... 2138302

[51] Int. Cl.$^6$ ....................................................... H04L 9/00
[52] U.S. Cl. ............................................................. 380/25
[58] Field of Search ........................................ 380/25, 21

[56] References Cited

U.S. PATENT DOCUMENTS

| | | | |
|---|---|---|---|
| 5,214,700 | 5/1993 | Pinkas et al. | 380/25 |
| 5,220,603 | 6/1993 | Parker | 380/25 |
| 5,339,403 | 8/1994 | Parker | 380/25 |
| 5,349,643 | 9/1994 | Cox et al. | 380/25 |
| 5,481,613 | 1/1996 | Ford et al. | 380/21 |
| 5,491,752 | 2/1996 | Kaufman et al. | 380/25 |
| 5,495,533 | 2/1996 | Linehan et al. | 380/25 |
| 5,535,276 | 7/1996 | Ganesan | 380/25 |
| 5,537,475 | 7/1996 | Micali | 380/25 |
| 5,590,199 | 12/1996 | Krajewski, Jr. et al. | 380/25 |
| 5,659,616 | 8/1997 | Sodia | 380/25 |

Primary Examiner—Salvatore Cangialosi
Attorney, Agent, or Firm—Douglas W. Cameron; Ronald L. Drumheller

[57] ABSTRACT

In a distributed computing environment, in which a client needing to access a server is issued, by a security server, with a ticket including an encoded certificate identifying, when decoded, the identity and privilege attributes of the client in a format understood by a server within the environment, access to a resource external to the environment through such a server within the environment is provided, when a request involving such access is received by the security server, by issuing an extended certificate including additional data which can be decoded to provide information decoded as to the identity and privilege attributes of the client with respect to and in a format acceptable to the external server, the additional data being recognized and decodable and formatable by that server within the environment which provides access to the external server, but transmitted within the environment in a format compatible with the certificates in regular tickets. A security server issuing a ticket including such an extended privilege attribute certificate has a registry extended to include data as to a client's privilege attributes with respect to accessible external servers, together with data as to the structure in which such data is to be presented, and an application server required to handle such extended certificates has attribute handlers to structure the decoded data for presentation to the external server.

4 Claims, 2 Drawing Sheets

PROVISION OF SECURE ACCESS TO EXTERNAL RESOURCES FROM A DISTRIBUTED COMPUTING ENVIRONMENT

DESCRIPTION

1. Technical Field

This invention relates to security in computer networks implementing distributed computing and more particularly to permitting access by clients within such a network and utilizing a ticket based security system to resources accessible from the network but utilizing a differently based or incompatible security system.

2. Description of the Prior Art

Distributed computing systems involve the organization of two or more machines communicating over a network to provide distributed applications and data sharing. An example of a distributed computing system is the distributed computing environment released by the Open Software Foundation (hereinafter OSF™) to support distributed computing involving heterogeneous machines and operating systems. The OSF distributed computing environment (hereinafter DCE) utilizes a ticket based security system based upon the Kerberos Network Authentication service which was developed at the Massachusetts Institute of Technology as part of that organization's Athena project. Reference may be made to the published documentation of that project for further details of Kerberos, which details however form no part of the present invention.

In a client-server network environment such as DCE, a security server or TGS (ticket granting server), which maintains a registry of client attributes, having verified a client log-in request, issues to a client a privilege ticket granting ticket (PTGT), indicating details of the client's privilege attributes. The client may thereafter present this ticket to the security server with a request for service by an application server on the network, which returns to the client a further ticket or key which authenticates the client and its security attributes, and may be presented to a DCE server with a request for service. In DCE, the client's identity and attributes are contained in a privilege attribute certificate (PAC) which is included in the various tickets passed between a client and the security and application servers. In such a system, further description of which will be found in the book "Introduction to OSF DCE", Open Software Foundation, published 1992 by Prentice- Hall, Inc., the PAC contains identity and security attributes (principal and group attribute sets) relevant to the DCE environment so that the security server can place the client's PAC in a ticket issued in response to a service request (typically a remote procedure call (RPC)), and an application server to which the client presents the ticket can ascertain from the PAC whether it should honor the request.

Within DCE, a client's identity and privileges are transmitted to a server in the client's privilege attribute certificate (PAC). Authorization decisions are made by the server based on the information contained in the PAC. This works well as long as the clients and servers use only principal and groupset information formatted for DCE when making authorization decisions.

In a heterogeneous computing environment, there can exist DCE servers that act as gateways to non-DCE resources, i.e. resources outside the DCE environment. Access to these resources will be controlled by non-DCE access control managers that do not understand DCE PACS. Instead, these ACL managers will base authorization decisions on different forms of identity and privilege information—typically alphanumeric userids and group ids. DCE clients presenting DCE privilege information to such a gateway will not be able to access the non-DCE resources because the clients present only DCE privilege attributes in their PACS, while the access control managers associated with the resources expect and understand non- DCE privilege attributes. DCE client requests arriving at such servers will be unable to receive service from the external resources due to the incompatible authentication and authorization identity schemes being employed by the client and the server.

In order to solve this problem, a secure facility is needed that associates a client's non-DCF identities and privileges with its DCE identity. This then enables DCE client access to external data and resources through gateway servers.

Various methods were considered to transfer a DCE client's non-DCE privileges to a DCE server, described below with short discussions of their advantages and disadvantages.

According to a first approach, any client privileges that are required by an application server are retrieved, from a registry maintained on the security server, by the application server. The DCE client requests a ticket for an application server, and presents the ticket to the application server in the normal way. The client's PAC contains only DCE privilege attributes; the client's non-DCE privilege attributes are stored in the registry as extended attributes. If the application server requires any of the client's non-DCE attributes, it retrieves them from the registry by making an explicit RPC to the registry.

Advantages:
no changes required to client code;
no changes required to Kerberos code in security server.
Disadvantages:
in DCE, the PAC is the mechanism through which privileges are transferred from client to server—this technique would violate this philosophy;
performance—the application server must query the registry (i.e., make a remote procedure call) before a client request can be satisfied.

According to a second approach, the client's non-DCE privileges could be combined with its DCE privileges in an extended PAC (XPAC). There are various points at which non-DCE privilege attributes can be placed into an XPAC.

(a) Automatically, when a PTGT is first acquired by a client. This is analogous to the current DCE PAC mechanism. In the current DCE, a client retrieves its complete set of DCE groups (i.e., its DCE privileges) during its login processing and places the group list in its login context. When the client later requests a PTGT (either at a subsequent point during the login sequence or when it requests its first server ticket), the group list is submitted with a request for a new PTGT.

The groups are verified by the privilege server and placed into the PTGT in the form of a PAC. This method of automatic privilege retrieval can also be applied to the client's extended privileges. However, incorporating extended privileges would require the client to retrieve all its extended privileges at login time and submit them in the PTGT request. The advantages and disadvantages are as follows:

Advantages
the Kerberos TGS request processing requires no change
Disadvantages
client login code must be changed client retrieves all privileges regardless of whether they are required does not scale well (b) On demand, when a PTGT is first acquired. This is similar to the previous method. However, the extended attributes are not automatically retrieved. Instead, all extended attributes are retrieved when the client knows that it will access non-DCE servers. This method requires some intelligence at the client. The client must determine whether it wants an XPAC or not. The advantages and disadvantages are as follows:

Advantages:

the Kerberos TGS request processing requires no change.

Disadvantages:

client must know that it will access non-DCE servers;

client retrieves all privileges regardless of whether they arc required;

does not scale well.

(c) On demand, with a PTGT tailored for specific server. In this method, the client requests only specific extended privileges (because it wants to access specific non-DCE resources) and submits a request for a new PTGT containing these privileges in an XPAC. The advantages and disadvantages are as follows:

Advantages:

the Kerberos TGS request processing requires no change;

scales well.

Disadvantages:

client must be highly intelligent;

client must know that it will access a non-DCE server (may not always be possible—eg, in cases of delegation, it may not be possible for a client to know about final target server)

client must know what attributes to place in PAC client must request a new PTGT when it wishes to access a non-DCE server.

SUMMARY OF THE INVENTION

The present invention uses a further variation of the second approach. It is an object of the present invention to implement a ticket based security system within a computing environment in which privilege authorization certificates or an equivalent data element included in tickets issued to a client to access resources can be extended where necessary to include identity and privilege data necessary for the client to access a resource accessible from the environment but utilizing a security system incompatible with the conventional authorization package.

In the context of DCE, utilized throughout this disclosure as an exemplary environment wherein which the invention may be implemented, this entails utilizing an extended PAC (or XPAC) designed t o achieve the following objectives:

Provide a mechanism for non-DCE privilege attributes to be inserted into the PAC;

Require no changes to DCE client code (and thereby maintain full transparency at the DCE client);

Maintain interoperability with all DCE servers that do not use XPACs (i.e., DCE servers built using existing (DCE 1.0) technology, and current and future DCE servers that neither understand nor expect extended PACS);

Minimize modifications to existing TGS and security runtime code;

Minimize number of required remote procedure calls;

Enable easy addition of new extended attributes to system;

Scale well to large, distributed environments.

Use of the XPAC mechanism imposes the following constraints on the configuration of the DCE environment:

1. The security server in a cell containing servers that use XPACs must be one that can invoke the XPAC extensions.

2. A server that wants to use XPACs must include the runtime code that can process XPACs.

With the present invention, the client is not even aware that extended privileges are to be added to its PAC. When the TGS issues tickets for application servers, it adds extended attributes only for those application servers that require them. Similarly, the TGS adds only the specific attributes required by the application server (as opposed to adding all of the client's attributes). Advantages are total transparency at client and good scaling, and disadvantages are that TGS request processing requires changes.

According to the invention, there is provided in a distributed computing environment of the type including a security server having an attribute registry containing data concerning client identities and attributes and client privileges in relation to resources within the environment, which server issues tickets on demand to clients requiring service by a server within the environment, the tickets including privilege attribute certificates containing encoded data which on presentation to a server can be decoded to provide information as to a client's identity and privilege attributes within the environment, and at least one application server within the environment providing access to a resource external to the environment and having security requirements incompatible with those of the environment, the improvement wherein the security server has an extended registry containing additional information as to client identities and privilege attributes with respect to said at last one external resource, together with data as to the structure in which each external resource requires the information, and means to include such additional information as further encoded data in a ticket requested by a client for service by a server providing access to an external resource; and a server providing access to an external resource has means to recognize further encoded data and means to decode such data and place it in a structure required for access to the external resource.

DESCRIPTION OF THE PREFERRED EMBODIMENT

Figure 1:
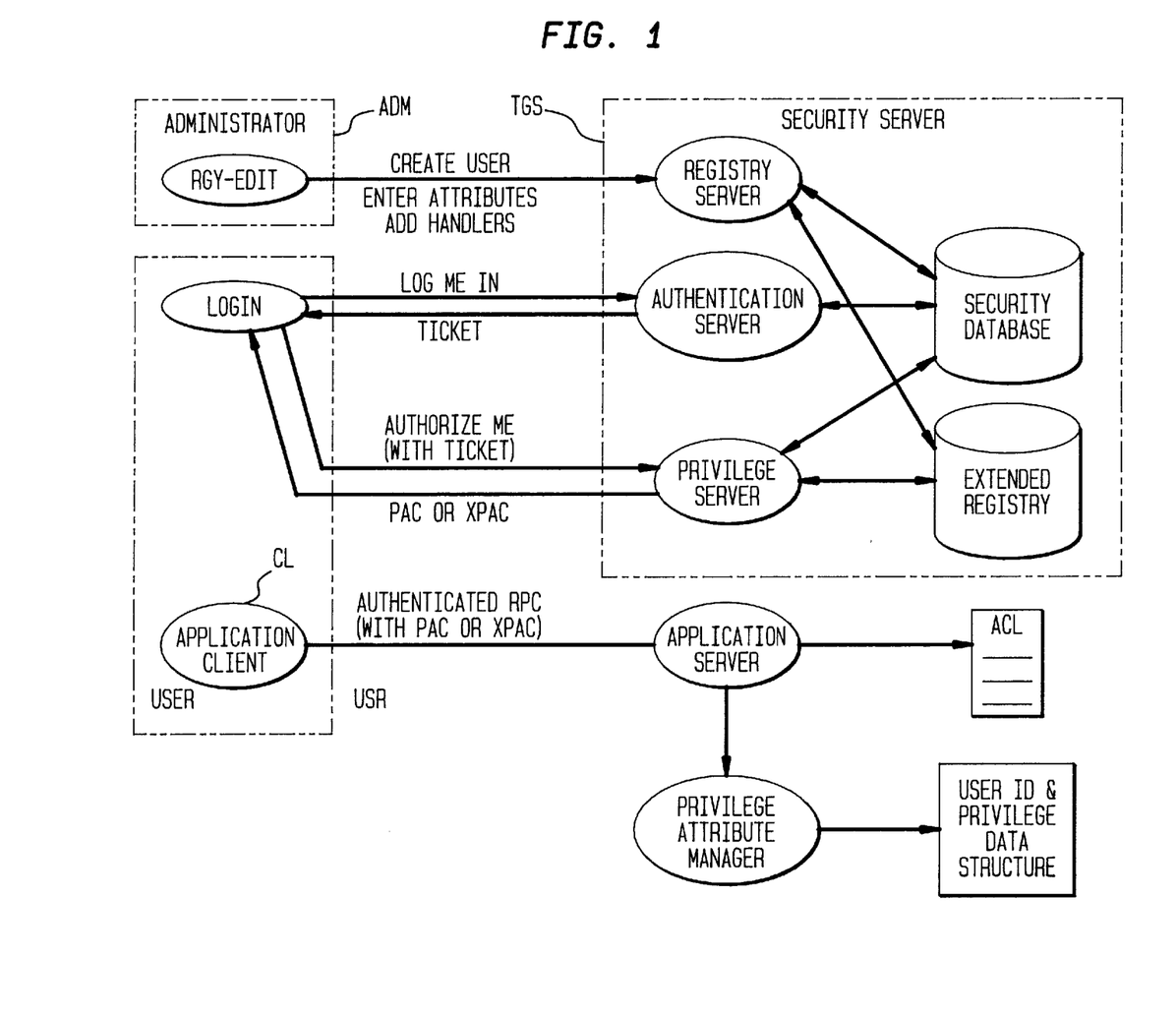
FIG. 1 diagrammatically illustrates interactions between an administrator, a security server and a user.
Figure 2:
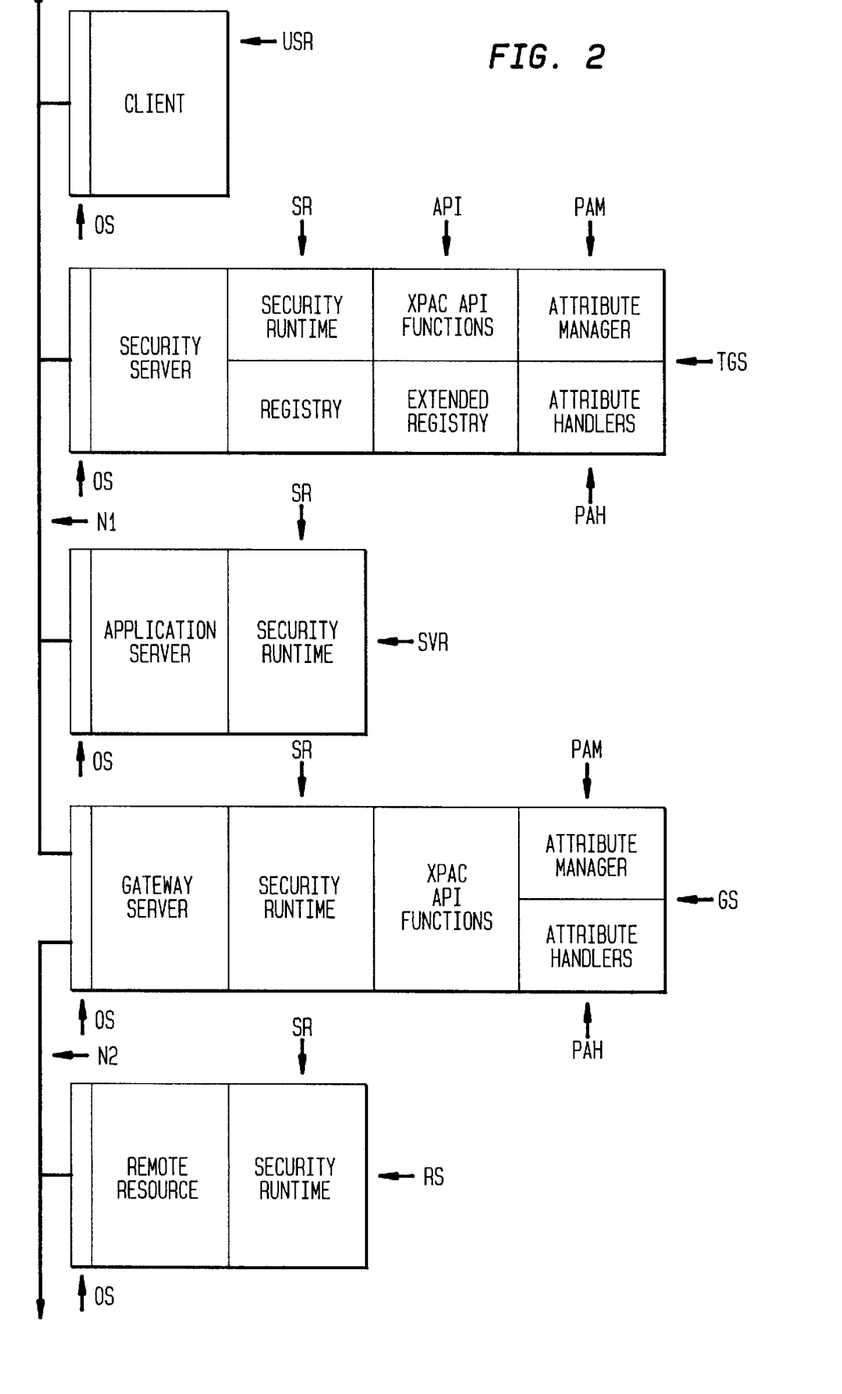
FIG. 2 is a diagrammatic representation of relevant parts of a network.

FIG. 1 shows security interactions in parts of a network incorporating the present invention, while FIG. 2 illustrates the structure of relevant parts of the network. FIG. 2 illustrates a client and various servers running on separate machines connected networks. It should be understood that in some cases different 'servers' may be implemented by processes running on the same machine, that the same machine may have resources both inside and outside the DCE environment, and that multiple instances of a server may run on different machines. In FIG. 1, it will be seen that the security server interacts with an administrator ADM who utilizes a program referred to here as rgy-edit, a DCE attribute registry editor, to enter the DCE attributes of clients in order to create a user such as USR, who may run an application client CL which issues a remote function call RPC to an application server SVR. If the server SVR is a DCE server, it will process a privilege attribute certificate PAC provided by the client to compare its contents with an access control list ACL. When the user USR logs in, the log-in process sends a log-in request to an authentication server in the security server TGS which issues a ticket PTGT to the user enabling it to request access to DCE resources. If the user's application client needs to access the resources of a server SVR, it requests a ticket for the purpose from the security server TGS which provides (assuming that the user has appropriate privileges) a server ticket including a PAC for provision by the client to the server SVR. All of the foregoing applies to regular DCE operations.

The extensions provided by the present invention are described further below, in the context of a network N1 as shown diagrammatically in FIG. 2, in which a DCE network also includes a gateway server GS through which is accessible a non-DCE server RS, possibly by a secondary non-DCE network N2 as shown, or possibly located in the same machine. Each server is connected to its network or networks by a local and network operating system OS, and each security server and application server will have a security routine process SR to handle security aspects of requests received from the networks.

A central feature of the embodiment of the invention being described is the extended PAC or XPAC. A PAC is a data structure that contains DCE identity and privilege attributes that apply to a DCE client. A PAC is sent from a client to a server in the authorization data field of a ticket commonly known as a Kerberos ticket. The authorization data is composed of a list of authorization data elements. The PAC is one of these elements, and in regular DCE it is the sole element in the authorization data.

The PAC is not simply copied into the ticket; it is first pickled and then converted to authorization data. To pickle a PAC is to flatten out the PAC data structure and convert the fields into a format that can be transferred over the network. This is done before a ticket is encrypted. The pickled result is often called a pickle.

When a ticket arrives at a DCE server, the server's security runtime module is responsible for reassembling the PAC from the authorization data. The encrypted ticket is decrypted and the authorization data is converted to a pickled PAC, which must then be unpickled. Unpickling a PAC involves reversing the actions of a pickling process. The transmitted format of the PAC is converted back to a data structure format.

An XPAC is transferred from a client to a server in the same way as a PAC. It is pickled and sent as a single authorization data element in a ticket's authorization data field. The authorization data element itself is extended to hold not just a single pickle (the base DCE pickled PAC), but a list of pickles (the base DCE. pickled PAC followed by a set of additional pickles, each additional pickle representing an extended attribute).

Privileges and identities are entities that every security mechanism defines differently. The identity of a DCE client is expressed in a different form from that of a client in other computing environments such as a local area network. However, regardless of the way the identity and privileges are expressed, the present invention enables a DCF client to present all its various identities and privilege attributes in an XPAC. To achieve this, the following objects are used:
   privilege attribute object
   privilege attribute handler
   privilege attribute manager
   privilege object Each of these objects is discussed in further detail below.

The basic unit of privilege in the XPAC design is the privilege attribute object. This object contains three pieces of information, an attribute type, an attribute encoding, and an attribute value. The attribute encoding specifies how the attribute will be converted to a pickle. There are two general types of attributes: simple and complex. Simple attributes contain an attribute value composed of a single entity. Simple attributes can be encoded/decoded using a default set of encoding/decoding functions. As an example, a simple attribute might have an attribute value containing a single character string (or a single integer). The attribute would be encoded/decoded using character string (or integer) encoding/decoding. Complex attributes might be arbitrarily complex. The attribute value of a complex attribute might contain a combination of character strings, integers, and byte streams. A complex attribute can be encoded/decoded only by customized functions that have knowledge of the format of the attribute's value. These customized functions are provided in an attribute handler (see below for a description of attribute handlers).

As mentioned above, the information contained in the attribute value will differ depending on whether the attribute is simple or complex. For simple attributes, the attribute value is a single piece of information and may be extracted directly from the attribute. For complex attributes, the value may contain many pieces of information. The attribute handler must provide a function that knows how to extract the different pieces of information.

An example of a complex attribute is one that contains two pieces of information—a character string representing a USER ID and a list of character strings representing GROUP ID's. The attribute handler supplied with this attribute would provide an extraction function that would be used to extract any individual piece of information contained in the attribute (e.g., the USER ID).

A complex privilege attribute that is to be used in the DCE environment must also be accompanied by a set of definitions and functions that is used to define and manipulate the attribute. The package of definitions and functions that apply to a privilege attribute is called a privilege attribute handler.

A privilege attribute handler externalizes the following:
   an initialization function that is used to register the attribute supported by the handler with the server's attribute manager; and
   a function vector that includes functions that can be used to gain information about the attribute class or process and manipulate instances of the attribute class.

The initialization function returns information about the attribute class. This includes the attribute class identifiers (name and UUID), and the attribute class function vector. The function vector for an attribute class contains functions that do the following:
   create an instance of the attribute class;
   return the UUID) that identifies the attribute class;
   return the character string name that identifies the attribute class;
   print the information contained in an attribute instance;
   pickle an attribute instance;
   unpickle an attribute instance;
   extract information from an attribute instance; query the registry for information to be placed in an attribute instance;
   free the resource allocated to an attribute instance; free the information that was previously extracted from an attribute instance.

Each attribute handler will provide its own customized versions of the above functions to handle instances of its attribute class.

Privilege attribute handlers PAH (FIG. 2) are used by both the TGS and by target application servers GS. The TGS uses the functions provided a privilege attribute handler to retrieve the various parts of the attribute from the registry, build the attribute and then pickle it (so it can be placed in the XPAC portion of a Kerberos ticket). A target application server uses the handler functions to unpickle an attribute after extracting it from an XPAC, and to extract specific information from the attribute. It should be noted that attribute handler functions are never called directly by application server code or TGS code. They are called under XPAC security runtime APIs (application programming interfaces) and the XPAC application server APIs. This insulates the application server and TGS logic from the attribute handler functions.

In general, privilege attribute handlers are linked (either statically or via dynamic link libraries (DLLs)) with application server code. An exception arises in the case of the ticket-granting security server. With the TGS, attribute handlers are 'attached' to the server dynamically when the security server initializes. This is done to enable the TGS to add or delete attribute handlers without having to recompile and relink the TGS code. Because attribute handlers manipulate security attributes, only security administrators should be authorized to add attribute handlers to the security server.

The privilege attribute manager PAM (FIG. 2) is the component that stores the information indicating which classes of complex attributes are defined to a server. Each server contains one privilege attribute manager component.

Before a server can manipulate a complex attribute, it must register the attribute and its associated handler with the attribute manager. (Attribute registration can be done at server initialization time.) An attribute is registered by passing the attribute manager the address of an initialization function. This function is exported by the attribute's handler. The attribute manager uses the initialization function to obtain and store the following information that pertains to the attribute class, namely the attribute class UUID, the attribute class name, and the attribute class function vector.

The UUID and name identify the attribute class, and the function vector provides the functions necessary to manipulate an instance of the attribute class. The attribute manager obtains all this information from the attribute handler and stores it in an internal lookup table.

When an attribute is to be processed by a server, the server must first determine whether the attribute is simple or complex. If the attribute is simple, the default routines can be used. If the attribute is complex, the server queries the attribute manager to determine whether the complex attribute is registered. If it is, the attribute manager returns to the server the function vector that can be then used to process the attribute. If the complex attribute is not registered, the attribute manager returns an error status and the server should ignore the attribute.

A privilege object is a container of privilege attributes. An XPAC is a privilege object that contains DCE attributes and non-DCE attributes. For example, an XPAC could contain a DCE part and one local host security subsystem privilege attribute. From the point of view of the privilege object, the privilege attributes that it contains are opaque data objects. A privilege object can contain any number of privilege attribute objects.

FIG. 2 shows the major components involved in a client-server exchange that uses the XPAC extensions. A DCE client wishing to access a DCE server requests a ticket for that server from the DCE TGS. The TGS consults its extended registry to determine whether the target server is one that is associated with a non-DCE privilege mechanism. A target server associated with a non-DCE privilege mechanism requires that a client present an XPAC (containing non-DCE privileges in addition to DCE privileges) instead of a PAC. If the target server does require an XPAC, the TGS obtains the client's appropriate extended attributes from the extended registry and builds an XPAC.

The client eventually presents the service ticket to the server over network N1. The server obtains a pointer to the client's XPAC by calling the same procedure as for a PAC. The server can then extract various extended attributes from the XPAC using the APIs described below.

From the point of view of a DCE client, nothing changes. A client requesting access to non-DCE resources requests a ticket to the DCE server controlling access to the resources. The client passes its PTGT to the TGS, and receives a server ticket in response.

The ticket the client receives contains an XPAC rather than a regular DCE PAC. This is transparent to the client. When the client eventually calls the target server, it passes the server ticket containing the XPAC.

An XPAC can be built and used only after an administrator configures extended attribute information in the extended registry for client and target server principals. For a target server that uses extended privilege attributes, the administrator must define a server privilege mechanism record for each extended attribute the target server will use. A server privilege mechanism logically extends the target server's registry entry to include a set of privilege attributes required for access to the server, and an optional additional data that applies to each privilege attribute.

Each privilege attribute in the set is specified by a UUID. This UUID will be either the UUID of a single simple attribute that must retrieved directly from the registry and placed in the client's XPAC, or it will be the UUID of a complex attribute that an attribute handler will build and insert into the XPAC. If the privilege attributes to be placed in the XPAC must be qualified in any way, the additional data can be used for this purpose.

The use of the privilege mechanisms and additional data can be best illustrated by the following example:

Server 1 requires that the client present its access code to its local host in an XPAC before it can gain access to the server's non-DCF resources. Server 1 resides on machines A, B, C, D, and E. Instances of Server 1 on machines A, B, and C use an attribute of type A1, while instances of Server 1 on machines D and E use an attribute of type B1. Both A1 and B1 attributes are simple attributes. Therefore, the XPAC must contain the client's A1 and B1 attributes, identified as simple attributes so that the required data structure, i.e. a simple default structure, is known.

Server 2 is a server providing gateway access to external resources. To access these resources, a client must present a complex attribute that contains a whole user profile (including userid's, group list, and other security data). Instead of specifying all the individual attributes as a list of simple attributes, a complex privilege attribute A2 is defined. An instance of attribute A2 contains in its value field a user profile. A2 can be used only if A2's attribute handler is installed at both the security server and the target server. A2's handler is code that knows how to seal and extract a user profile into and from an XPAC. The administrator would specify the following data in the registry for the servers Server 1 and Server 2:

| Server<br>Principal | Required Privilege<br>Mechanisms | Additional Data |
| --- | --- | --- |
| Server1 | A1<br>B1 | A,B,C<br>D,E |
| Server2 | A2 | none |

The field labelled Additional Data is an optional entry that can be used to further qualify the information to be placed in the XPAC. The format and semantics of the information in this field can be understood only in the context of the attribute to which it applies. In the above diagram, Additional Data "A,B,C" is understood to mean local machines A, B, and C, in the context of attribute A1.

An administrator using rgy_edit enters the required privilege mechanisms as character strings. These are converted to UUIDs. The additional data is entered in a format meaningful to the attribute type it applies to. For example, if the additional data is a list of machines, it, too, might be entered as a list of character strings. These character strings might then be converted internally to UUID's. The administrator will also have to enter all required extended privilege attributes for each client that accesses the above target servers. The client principal entry will look like:

```
Client Principal:

base DCE attributes
extended attributes       ----- >      A1-A-value1
                                       A1-B-value2
                                       A1-C-value3
                                       BI-D-value4
                                       B1-E-value5
```

A mechanism to add extended privilege attributes to the security registry database DB is necessary. An example of a suitable mechanism is the Extended Registry Attribute (ERA) mechanism proposed in DCE RFC 6.0 available from the Open Software Foundation. In the rest of this disclosure, this required mechanism is referred to as the ERA. The ERA mechanism will be invoked by the DCE administrator to add extended server and client attributes ERA to the server and client registry entries DB (FIG. 1). This ERA mechanism should be accessible using external APIs and via a DCE administrative utility (eg. rgy_edit). Similarly, the TGS will have access to the ERA in order to retrieve the extended privilege attributes from the registry.

In unmodified DCE, when the TGS receives a client request for a server ticket, it decrypts and decodes the incoming PTGT (which contains the PAC in the Kerberos authorization data field), blindly copies the authorization data from the PTGT to the destination server ticket, and then re-encodes and re-encrypts the resultant ticket.

The XPAC design imposes changes to the security server in two locations, namely security server initialization and TGS request processing. When the security server first starts, it must now read an extra configuration file. This file contains a list of filenames.; Each filename represents a file containing an attribute handler for a complex privilege attribute. The security server dynamically loads the functions contained in each attribute handler. By dynamically loading the attribute handlers PAH, new attributes can be added to the system without the need for recompilation or relinking. A new attribute can be added by adding the filename containing the handler to the configuration file, stopping the TGS and then restarting the TGS (so that the new, updated list of handlers can be loaded). An alternative is to update the configuration file and load new handlers without stopping the TGS if the administration of the configuration file is integrated into the framework of rgy_edit.

When the TGS loads an attribute handler, it registers the handler with the privilege attribute manager PAM. When the TGS later needs access to the handler's functions, the attribute manager will provide the access.

In the second change to the TGS, the TGS request processing is modified slightly so that incoming authorization data carrying a PAC is changed to outgoing authorization data carrying an XPAC. When a client request for a server ticket arrives at the TGS, the TGS request processing begins with the normal decoding and decrypting operations, as in the current DCE. However, before copying the authorization data from the PTGT to the server ticket, the TGS initiates a two-step lookup procedure. In the first step, the TGS uses the ERA mechanism (see above) to determine whether the target server is associated with any non-DCE server privilege mechanisms. If no such server privilege mechanisms exist, the TGS issues the target server ticket using the regular TGS request processing. However, if any non-DCE server privilege mechanisms apply to the target server, the TGS initiates the second step of the lookup.

The second step of the lookup involves retrieving the client's extended attributes that apply for each non-DCE server privilege mechanism. Each privilege mechanism identifies the class of extended privilege attributes that must be presented to the target server (i.e., the privilege mechanism UUID is equivalent to the attribute class UUID). For each mechanism, the TGS first queries the privilege attribute manager to determine whether there is a handler for that class of attributes. If there is, the privilege attribute manager returns the function vector that applies to the attribute class. The TGS uses this vector to retrieve the attribute that belongs to the client and applies at the server. The function vector is used again to pickle the attribute, the TGS appends the pickle to the authorization data field (that contains the base DCE privileges) in the server ticket, and the server ticket is returned to the client.

If there is no attribute handler, the TGS assumes that the attribute required is a simple attribute and uses the ERA mechanism to retrieve the attribute from the client's registry entry. The attribute is pickled using the default pickling routines, the TGS appends the pickle to the authorization data field in the server ticket, and the server ticket is returned to the client.

The format of an authorization data field with extended privileges appears below:

```
Authorization data category (OSF-DCE)
length              (includes base and extra pickles)
contents            ---- >          base DCE pickle
                                    attribute 1 pickle
                                    attribute 2 pickle
                                         .
                                    attribute N pickle
```

An application server that requires extended privilege attributes is aware that it must deal with an XPAC. The server also knows which types of extended attributes it needs. In order for a server to use the information contained in the XPAC, the server must register the types of attributes that it will use, and extract the desired information from the extended attributes contained in the XPAC.

When a server registers an extended attribute type, it provides the information necessary for the security runtime to process that type of attribute. This information is the address of an initialization function for the attribute. When a server registers an attribute, the privilege attribute manager for the server uses the initialization function to obtain and store class information for the attribute. This information includes an attribute class specifier (a UUID), an attribute class string name and a function vector that contains the routines that are used to manipulate instances of attributes from the class. The target server's privilege attribute manager stores this information in an internal lookup table in the same way the TGS does (see FIG. 1).

When a ticket containing an XPAC arrives at the server, the server's runtime security module parses the Kerberos authorization data and builds an XPAC privilege object. During the parse, it first extracts the DCE privileges. If there are extensions (i.e., extra pickles appended to the DCE pickle), it examines the class of each extension and queries the privilege attribute manager for the function vector for that class. If the privilege attribute manager has the class registered, the function vector is returned, the vector's unpickling routine is called, and the unpickled attribute is added to the privilege object. If the attribute manager has no handler registered for the class, the attribute is ignored. The application server can access the extended privileges by calling one of the external APIs discussed in this disclosure and extracting the desired attribute. DCE 1.0 servers will ignore the extended privileges contained in an XPAC. They will treat an XPAC like a DCE 1.0 PAC.

The privilege object corresponding to an XPAC will have the following form:

```
base DCE part
extension UUID
number of attributes
attribute 1 ----------------- > A1 fields
attribute 2 ----------------- > A2 fields
```

The extension UUID is a UUID well-known to the security runtime module. It indicates the presence of extended attributes following the base DCE part. The absence of this UUID indicates that an 'old-style' PAC is being processed, and therefore the security runtime module will not attempt to process any extensions.

The following are the major steps involved in extended PAC processing:
 1. TGS starts up and loads any special privilege attribute handlers;
 2. server S starts up and registers any special attributes that it will recognize;
 3. client C requests ticket for S from TGS;
 4. TGS checks whether server S requires any extended privilege attributes;
 5. if so, TGS queries C's registry entry for instances of those attributes and inserts them into the server ticket;
 6. TGS returns to C a ticket for S;
 7. C sends request to S and passes ticket to S;
 8. S's security runtime extracts the XPAC from the ticket;
 9. S explicitly requests various attributes from the XPAC and uses them as necessary.

In regular DCE, a client in one cell wishing to access a server in a second cell can do so, provided that a trust relationship has been arranged by the DCE security administrators in the two cells. This is possible because the TGS in the server's cell can issue the service ticket for the client using the originating client's PAC.

If, however, a client in one cell wishes to access a server in a second cell, and the server requires the client's extended attributes, then the model becomes more complex. The only entity that knows that the server requires the client's extended attributes is the TGS in the server's cell. This TGS must be able to retrieve the extended attributes belonging to the client. One cannot assume that the client cell security server even supports extended privilege attributes. Instead, the server's cell must provide a mechanism to cross-register foreign principals in the cell and add extended attributes to these foreign principal entries.

This design assumes that the ERA mechanism provides a mechanism to cross-register foreign client principals and their attributes in a cell. With such a mechanism, requests originating in foreign cells that require XPACs will be processed in the following way:
 1. the TGS in the server's cell starts up and loads any special privilege attribute handlers;
 2. server S starts up and registers any special attributes that it will recognize;
 3. the administrator in the server's cell cross-registers client C in the cell and adds the client's extended attributes that apply to server S;
 4. client C requests ticket for S from its own TGS;
 5. a multi-cell interaction is initiated which eventually results in a request being made to the server's TGS for a server S ticket;
 6. this TGS checks whether server S requires any extended privilege attributes;
 7. if so, the TGS queries the cross-registered entry for foreign principal C for instances of those attributes and inserts them into the server ticket;
 8. the TGS returns to C a ticket for S;
 9. C sends request to server S and passes ticket to S;
 10. S's security runtime extracts the XPAC from the ticket;
 11. S explicitly requests various attributes from the XPAC and uses them as necessary.

This embodiment maintains interoperability with all servers that do not recognize XPACS. This is possible since, assuming the servers are registered properly by an administrator, only those servers that recognize XPACs will receive them and servers that do not recognize XPACs will never receive them in service tickets. Even if an administrator incorrectly registers a server as one that recognizes XPACS, the server will ignore the extensions in the XPAC and treat the XPAC as a DCE 1.0 PAC.

This embodiment proposes new APIs for inclusion in the DCE security service. The design requires very few changes to existing base DCE code and can be incorporated into base DCEwith the following changes to the base:
 1. a hook in the security server startup code to load privilege attribute handlers
 2. a hook in the TCGS processing code to add attributes to the ticket
 3. a hook in the security runtime to unpack an incoming XPAC All privilege attribute handling code specific to a particular resource to be accessed is either loaded dynamically (by the TGS) or linked in statically (by application servers). It is necessary to conform to the format specified for the attribute handler routines. Application servers wishing to make use of extended attributes call the new APIs.

The XPAC design disclosed herein provides a mechanism for a DCE client's non-DCE privilege attributes to be added into a PAC. The properties of the design can be summarized as follows:

No code changes are necessary to client-side code, and the mechanism is transparent to the client.

No explicit knowledge of the nature of the target server needs to be maintained by the client.

Servers that do not recognize XPACs are not affected.

Slight modifications are necessary to the TGS of the security server and to the security runtime of application servers wishing to use XPACS.

No additional remote procedure calls are introduced.

Additional extended attributes can be accommodated by loading new attribute handlers.

The extended attributes placed in the XPAC are only those that are needed for access to a specific target server.

APIs for Security Server

Load privilege attribute handlers
PARAMETERS
none
DESCRIPTION
This API is called by the TGS to load the list of privilege attributes that it can process.
HIGH-LEVEL FLOW
Read <filename of attribute handler module> from configuration file Dynamically load the attribute handler's initialization routine (registration function) from the module
Call a routine (see below) to register privilege attribute handlers, passing as input the address of the initialization routine
Append authorization data
PARAMETERS
Input
client name of client making TGS request
server name of server that is target of TGS request
Input-Output
authdata client's authorization data—new privileges are appended
DESCRIPTION
This is an internal function called by the TGS after it decodes and decrypts an incoming TGS request. If the target server in the request is one which requires that the client present special, non-DCE privileges, this function will retrieve these privileges and append them to the existing privileges contained in the authdata.
HIGH-LEVEL FLOW
Examine the incoming authdata and determine the first authdata element that is DCE authdata
Convert client and server names to uuids
Determine whether target application server uses non-DCE privilege mechanisms
For each privilege mechanism required by the server
determine whether the attribute has handler functions registered
if the attribute has handlers:
call its create function to create an instance of the attribute
call its query registry function to retrieve the attribute value from the client's extended registry entry
if the attribute has no handlers registered:
query the registry for the actual attribute
pickle the attribute
append the pickle to the set of pickles carried in the authorization data Security Runtime Functions
Build Extended PAC
PARAMETERS
Input
authdata Kerberos authorization data composed of a set of appended pickles
Output
pac the unpickled version of the XPAC
DESCRIPTION
This internal function is called by the security runtime of an application server. It converts Kerberos authorization data containing one or more pickled privilege items, unpickles the privileges and builds an XPAC. This function replaces the existing authdata-to-pac processing.
HIGH-LEVEL FLOW
Convert Kerberos authdata to a set of pickled attributes
Unpickle DCE part
For each additional pickle
unpickle the attribute
insert the attribute into the XPAC privilege object
Return the complete XPAC
Runtime functions are also provided to allocate space for incoming XPACs and to free this space when no longer required, to initialize and access a look-up table for privilege attribute managers, to release resources associated with such tables when no longer required and to register and deregister a privilege attribute manager.

APIs for Application Servers
Register privilege attribute handlers
PARAMETERS
Input
registration-info a pointer to opaque data containing the address of the initialization function for a privilege attribute
Output
attribute_class a UUID that identifies the attribute that was registered
DESCRIPTION
This API is called by a server to register the privilege attributes that it will recognize and process.
HIGH-LEVEL FLOW
Extract the initialization function from the registration information
Call the privilege attribute manager to register the attribute and return its function
vector, class UUID and class name
Return the class UUID to the caller
Deregister privilege attribute handiers
PARAMETERS
Input
attribute_class a uuid that identifies the attribute class to be deregistered
DESCRIPTION
This API is called by a server to deregister the privilege attributes that it had previously registered.
HIGH-LEVEL FLOW
Call the privilege attribute manager to deregister the attribute
Initialize cursor
PARAMETERS
Output
cursor pointer to an initialized cursor
DESCRIPTION
This API initializes a cursor for subsequent use in privilege attribute operations.

HIGH-LEVEL FLOW
  Allocate a cursor object
  Initialize the cursor
Reset cursor
  PARAMETERS
  Input-Output
    cursor pointer to cursor object
  DESCRIPTION
    This API resets an existing cursor. This is done to restart a query of privilege attributes.
  HIGH-LEVEL FLOW
    Reset the cursor object
Delete cursor
  PARAMETERS
  Output
    cursor pointer to cursor object
  DESCRIPTION
    This API frees the resources held by an existing cursor.
  HIGH-LEVEL FLOW
    Delete the cursor object
Extract a base DCE pac from an XPAC
  PARAMETERS
  Input
    privs pointer to client's XPAC
  Output
    dce_privs pointer to the base DCE pac extracted from the xpac
  DESCRIPTION
    This API extracts a base DCE pac from an XPAC. The output is a copy of the DCE pac contained in the XPAC.
  HIGH-LEVEL FLOW
    Allocate memory for the copy of the DCE pac
    Copy the DCE pac into the newly allocated memory
Free the resource associated with a base DCE PAC
  PARAMETERS
  Input
    privs the base DCE PAC whose resources are to be freed
  DESCRIPTION
    This API frees the resources associated with a base DCE PAC that was obtained via a call to the preceding API.
  HIGH-LEVEL FLOW
    Free the DCE pac
Free the resource associated with an extended PAC
  PARAMETERS
  Input
    privs the extended PAC whose resources are to be freed
  DESCRIPTION
    This API frees the resources associated with an extended PAC.
  HIGH-LEVEL FLOW
    Free the dynamically allocated parts of an xpac
    Free the remainder of the xpac
Extract a privilege attribute
  PARAMETERS
  Input
    privs pointer to client's XPAC
    attribute_type type of privilege attribute to be extracted from XPAC
  Input-Output
    cursor pointer to cursor object Output
    attribute pointer to extracted privilege attribute
  DESCRIPTION
    This API extracts a privilege attribute from the XPAC. If the attribute type input parameter is specified, the XPAC is scanned to find an attribute that matches the specified type. The search for a matching privilege attribute starts from the cursor position. If the attribute_type input parameter is set to NULL, the next privilege attribute (after the cursor) is returned. Upon a successful extraction, the cursor position is updated to refer to the extracted privilege attribute.
  HIGH-LEVEL FLOW
    Check that the pac passed in is an XPAC
    Start at cursor position
    If cursor points past last attribute, return an error
    Loop
      get next attribute
      if attribute_type is specified, check for match on attribute_type
      update cursor position
    Until match found or end of list
Create an Instance of a privilege attribute
  PARAMETERS
  Input
    attribute_type type of privilege attribute to be create
  Output
    attribute pointer to newly created attribute
  DESCRIPTION
    This API creates an instance of a privilege attribute of a specific class. A generic instance of the class is created, and instance specific values are left to be filled in by later function calls. This function is called by the security server when building up an XPAC to be placed in a client's credentials, and it is also called by the security runtime of an application server when it builds a XPAC using incoming client credentials.
  HIGH-LEVEL FLOW
    Check whether the attribute class is registered Allocate memory for the attribute instance Initialize the instance with non-instance-specific data, leaving any instance-specific fields to be filled in later
Free the resource associated with an attribute
  PARAMETERS
  Input
    attribute the attribute whose resources are to be freed
  DESCRIPTION
    This API frees the resources associated with a privilege attribute.
  HIGH-LEVEL FLOW
    Check whether the attribute class is registered
    Free the attribute-class-specific parts of the attribute
    Free the rest of the resources associated with the attribute
Extract the type of a privilege attribute
  PARAMETERS
  Input
    attribute pointer to a privilege attribute
  Output
    attribute_type the type of the privilege attribute
  DESCRIPTION
    This API returns the type of a specific privilege attribute. The 'attribute-type' output parameter is allocated by the caller. HIGH-LEVEL FLOW Return uuid representing the type (i.e., the class) of a privilege attribute
Extract a value from a privilege attribute
  PARAMETERS
  Input
    attribute pointer to a privilege attribute
    criteria for complex attributes, this will specify what part of the attribute should be returned Input-Output
  cursor pointer to a cursor object
Output
  attribute—value a value contained in the privilege attribute
DESCRIPTION
  This API returns a value contained in a privilege attribute. If the attribute is a simple one, the criteria and cursor inputs are ignored. If the attribute is complex, the criteria specifies what value is to be returned. If the attribute contains multiple instances of the desired criteria, the cursor is used to returned the next instance. The memory used by the returned attribute value is allocated by this function and must be freed with a call to the following API.
HIGH-LEVEL FLOW
  If simple attribute, return its value
  If complex, check lookup table to see whether it can be handled
  If so, call its extract function
Free the resource used by an attribute value
  PARAMETERS
  Input
    attribute pointer to a privilege attribute
  Input-Output
    attribute value the attribute value to be freed
DESCRIPTION
  This API frees the resource used by an attribute value.
HIGH-LEVEL FLOW If simple attribute value, free it If complex, check lookup table to see whether it can be handled If so, call its free function Attribute Handler API's The following functions are provided by an attribute handler. The attribute handler is a vector of function pointers, and therefore the actual names of the functions are not important. When the vector is created, it provides pointers to functions that implement what is described in this section.
  CREATE
  PARAMETERS
  Output
    attribute pointer to a newly-created instance of a privilege attribute of the type defined by the attribute handler
DESCRIPTION
  Create an instance of a privilege attribute of the handler's type.
HIGH-LEVEL FLOW
  Allocate a new instance of the attribute
  Set the "attribute" output parameter to point to the new instance
TYPE
  PARAMETERS
  Input
    attribute pointer to a privilege attribute
  Output
    attribute type the UUID that specifies the type of the attribute
DESCRIPTION
  Set the "attribute type" output parameter allocated by the caller equal to the uuid that specifies the type of the attribute. The "attribute" input parameter can be NULL—this indicates that the type of the attribute class is desired as output (as opposed to the type contained in a specific attribute).
HIGH-LEVEL FLOW
  Check that the attribute is of the right class (or NULL) Set the "attribute type" output parameter to the attribute type for the attribute class
NAME
  PARAMETERS
  Input
    attribute pointer to a privilege attribute
  Output
    attribute name a character string representation of the attribute's name
DESCRIPTION
  Copy the name of the attribute class into the "attribute name" parameter. The "attribute" input parameter can be NULL—this indicates that the name of the attribute class is desired as output (as opposed to the name of a specific attribute). The buffer into which the name is copied is allocated by the caller.
HIGH-LEVEL FLOW
  Check that the attribute is of the right class (or NULL)
  Copy the string name of the attribute class into the buffer passed in as the "attribute name" output argument
PRINT ATTRIBUTE
  PARAMETERS
  Input
    attribute pointer to a privilege attribute
DESCRIPTION
  Print the information contained in an attribute.
HIGH-LEVEL FLOW
  Check that the attribute is of the right class
  Print information contained in attribute
ENCODE
  PARAMETERS
  Input
    attribute pointer to a privilege attribute
  Output
    encoded attribute pointer to an encoded (i.e., pickled) version of the attribute
DESCRIPTION
  Pickle the supplied attribute
HIGH-LEVEL FLOW
  Check that attribute is of the right class
  Calculate the memory needed to hold the pickle and allocate
  Pickle the attribute
DECODE
  PARAMETERS
  Input
    attribute pointer to a privilege attribute that will have a decoded (i.e., unpickled) version of its information filled in
    encoded attribute pointer to an encoded version of the privilege attribute
DESCRIPTION
  Unpickle the supplied pickle
HIGH-LEVEL FLOW
  Check that attribute is of the right class
  Unpickle the pickle
  Fill in the attribute with the unpickled information
EXTRACT
  PARAMETERS
  Input
    attribute pointer to a privilege attribute
    criteria handler-specific criteria that specifies what to extract Input-Output
  cursor pointer to a cursor that is used to traverse the information in the attribute
Output
  attribute value pointer to the desired information extracted from the attribute
DESCRIPTION
Extract specific information from an attribute Note: The extracted information is allocated by the extract function and it must be freed with a call to the free attribute value function.
HIGH-LEVEL FLOW
  Check that attribute is of the right class
  If the "cursor" is NULL, the search starts at the beginning of the information contained in the attribute
  Else, use the cursor as a starting point
  Search the attribute based on the input criteria
  If criteria satisfied, allocate memory to hold the "attribute value" and copy the information into the "attribute value" output
QUERY REGISTRY
  PARAMETERS
  Input
    attribute pointer to a privilege attribute
DESCRIPTION
Query the registry for the information to be placed in the attribute, and fill in the attribute
HIGH-LEVEL FLOW
  Check that attribute is of the right class
  Make the necessary calls to the registry to obtain the attribute value
  Allocate memory to hold the information returned by the registry
  Fill in the attribute value with the returned information
FREE ATTRIBUTE
  PARAMETERS
  Input
    attribute pointer to a privilege attribute
DESCRIPTION
Free the resource allocated to an instance of an attribute.
HIGH-LEVEL FLOW
  Free resource associated with the data contained in the attribute
  Free the resource associated with the attribute itself
FREE ATTRIBUTE VALUE
  PARAMETERS
  Input
    attribute value pointer to information extracted from an attribute
DESCRIPTION
Free the resource allocated to information that was extracted from an instance of an attribute.
  HIGH-LEVEL FLOW
  Free resource associated with the attribute value
  The foregoing functions will each return values to indicate correct completion or one or more error conditions.
  While the foregoing description has specific reference to application of the invention to DCE, it will be understood that it could also be applied in other distributed computing environments having similar authorization procedures for certified server access.
  Having thus described our invention, what we claim as new and desire to secure by Letters Patents is:

1. In a distributed computing environment having a security server that includes an attribute registry containing data concerning client identities and attributes and client privileges in relation to resources within the distributed computing environment, the security server issuing a ticket on demand to a client within the distributed computing environment requiring service by an application server within the distributed computing environment, the ticket including a privilege attribute certificate containing encoded data which, on presentation to said application server, is decoded by said application server to provide information as to the client's identity and privilege attributes within the distributed computing environment, said distributed computing environment further comprising:
  a gateway server within the distributed computing environment for providing access for clients within the distributed computing environment to a resource external to the distributed computing environment, the external resource having security requirements incompatible with those of the distributed computing environment;
  an extended registry within the security server, the extended registry containing additional information as to client identities and privilege attributes with respect to said external resource, together with data as to the structure in which said external resource requires the additional information;
  said security server automatically including said additional information as further encoded data in a ticket requested by a client for the gateway server; and
  means within said gateway server for recognizing said further encoded data in said ticket, and for decoding said further encoded data and placing the additional information in a structure required for access to the external resource.

2. A distributed computing environment according to claim 1, wherein the security server and the gateway server further comprise attribute handlers, the attribute handler at the security server automatically including the additional information as further encoded information in the privilege attribute certificate of a ticket for the gateway server and the attribute handler at the gateway server decoding and structuring the additional information to provide structured data for access to the external resource.

3. A distributed computing environment according to claim 1, wherein the further encoded data is included in a single data element following encoded data concerning the client's privilege attributes within the distributed computing environment.

4. A programming extension to a distributed computing environment in which a security server issues tickets to clients wishing to access servers, the tickets including privilege attribute certificates containing encoded information as to a client's identity and privilege attributes, and in which a gateway server provides access to a resource external to the environment, the external resource having security requirements incompatible with those of the computing environment, the programming extension comprising:
  means for reconfiguring the security server to issue a ticket in which the privilege attribute certificate is automatically extended to include within its structure additional encoded data from a database within the security server whenever the ticket is for the gateway server, the additional encoded data providing an identity for the client requesting the ticket and that client's privilege attributes with respect to the external resource, and
  means for reconfiguring a security module of the gateway server to recognize such extended privilege attribute certificate, to decode therefrom the additional data, and to structure the additional data for presentation to the external resource.

* * * * *